United States Patent [19]
Callies et al.

[11] Patent Number: 5,992,534
[45] Date of Patent: Nov. 30, 1999

[54] FOLDING BOOM

[75] Inventors: Robert Edwin Callies, Leigh; Mark Jeffery Nole, Genoa, both of Nebr.

[73] Assignee: Deere & Company, Moline, Ill.

[21] Appl. No.: 09/286,365

[22] Filed: Apr. 5, 1999

[51] Int. Cl.[6] .................................................. A01B 69/02
[52] U.S. Cl. ............................................ 172/126; 172/456
[58] Field of Search .................................. 172/126, 127, 172/128, 129, 132, 663, 666, 667, 668, 456

[56] References Cited

U.S. PATENT DOCUMENTS

| | | | |
|---|---|---|---|
| 4,207,950 | 6/1980 | Kinzenbaw | 172/126 |
| 4,449,590 | 5/1984 | Williamson | 172/126 |
| 4,986,367 | 1/1991 | Kinzenbaw | 172/126 |
| 5,379,847 | 1/1995 | Snyder | 172/128 |

*Primary Examiner*—Christopher J. Novosad

[57] ABSTRACT

A folding boom for a tri-fold row marker for an agricultural implement. The boom comprises three segments, an inboard segment pivotally coupled to the toolbar, a middle segment pivotally coupled to the inboard segment, and an outboard segment pivotally coupled to the middle segment. Control of the boom during folding and unfolding is maintained by a toggle link mechanism having a cam a cam follower and a system of pivots and linkages. Dynamic forces are dampened at both ends of the folding and unfolding by use of a cushion hydraulic cylinder with flow limiting structure at each end of the cylinder stroke.

13 Claims, 7 Drawing Sheets

FOLDING BOOM

BACKGROUND OF THE INVENTION

1. Field of the Invention

The invention is directed to a folding boom having three sections that are pivotally coupled to one another and in particular to a folding boom used as a row marker for an agricultural implement having an extended working position and a retracted transport position.

2. Description of Related Art

Row markers are commonly attached to agricultural implements, such as planters and grain drills, to mark the field for the farmer's next pass. As implements have become wider row markers have become longer. The longer row markers have folded transport positions and extended working positions.

As agricultural implements became wider, tri-fold markers were developed having three pivot points, see U.S. Pat. Nos. 4,207,950, 4,449,590, 4,986,367 and 5,379,847. In all three above-identified tri-fold designs, a single hydraulic cylinder is used to manipulate the folding and unfolding action of the row marker. In the first two designs, U.S. Pat. Nos. 4,207,950 and 4,449,590, a cable or chain is used to extend the outboard segment during an unfolding operation. The cable or chain does not control the movement of the outboard segment during the folding cycle, creating a high kinetic impact when the outboard segment engages a stop located on the middle segment. In U.S. Pat. No. 4,986,367, a control arm is used to extend the outboard segment. In U.S. Pat. No. 5,379,847 the segments of the boom rotate simultaneously when folding and unfolding.

SUMMARY OF THE INVENTION

It is one of the objects of the present invention to provide a row marker that operates within a specific space envelope so as to provide minimum projection beyond and above the machine structure when folded and unfolded, and to maintain a low profile during folding and unfolding operations.

It is a feature of the present invention that only the outer two segments float due to ground undulations by rotating relative to the inboard segment.

It is another object of the present invention that the hydraulic cylinder that extends and retracts the boom is located to minimize exposure to the environment.

It is another feature of the present invention that the hydraulic cylinder is located within the inboard segment of the boom and thus protected from the environment.

It is a further object of the present invention that the boom folds and unfolds quickly with a smooth folding operation without hard impacts with the ground or with rotational stops.

It is a further feature of the present invention that the hydraulic cylinder that extends and retracts the boom is a cushioning hydraulic cylinder in which the piston slows down as the piston approaches its ends of travel.

It is still another object of the present invention to provide a folding boom with a fully controlled operation with a single hydraulic cylinder to prevent free rotation of any segment of the boom.

It is still a further feature of the present invention that a cam and cam follower mechanism is provided to control the rotational position of the middle segment of the boom relative to the inboard segment as the boom folds and unfolds.

It is still another feature of the present invention that a latch is provided to hold a portion of the control linkage assembly fixed to control movement of the outboard segment of the boom.

The present invention comprises a folding boom for a tri-fold row marker for an agricultural implement. The boom comprises three segments, an inboard segment pivotally coupled to the toolbar, a middle segment pivotally coupled to the inboard segment, and an outboard segment pivotally coupled to the middle segment. A surface-marking device comprising a marker disc is mounted to the distal end of the outboard segment for marking the ground surface when said row marker is its extended working position.

The middle segment is provided with a first bell crank extending downwardly therefrom. The first bell crank is coupled to an inner control arm that is pivotally coupled to the toolbar through a toggle mechanism. The toggle mechanism includes a toggle link pivotally mounted to the toolbar with a cam follower and a cam slot in the inboard segment engaged by the cam follower to control the position of the toggle link. The inner control arm pivots the middle segment relative to the inboard segment when the hydraulic cylinder is extended or retracted. The inboard segment is provided with a second bell crank. The hydraulic cylinder is pivotally coupled to the agricultural implement and to the second bell crank through a pair of control links for retracting and extending the boom. An outer control arm is pivotally coupled to the second bell crank. The outer control arm is also coupled to the middle and outboard segments by two pivot links that are pivotally coupled to the outer control arm and to the middle and outboard segments. The outer control arm pivots the outboard segment relative to the middle segment when the hydraulic cylinder is extended or retracted.

Retracting the hydraulic cylinder from its extended position folds the boom into its retracted transport position. Extending the hydraulic cylinder from its retracted position unfolds the marker arm into its extended working position.

The toggle mechanism cam slot includes a float portion. The hydraulic cylinder is pivotally coupled to the toolbar by a pin extending through a float slot in a plate of the mounting bracket used to mount the boom to the toolbar. The float slot and the float portion of the cam slot allow the boom to float up and down with the contours of the ground to a limited degree. The boom floats by rotation of the middle segment and outboard segment relative to the inboard segment. In its extended working position the outboard segment is kept rigid with the middle segment by an outer stop positioned between the middle segment and outboard segment. The upward force of the marker disc pushes the outboard segment upwardly so that the outer stop locks against the middle segment.

DETAILED DESCRIPTION

Figure 1:
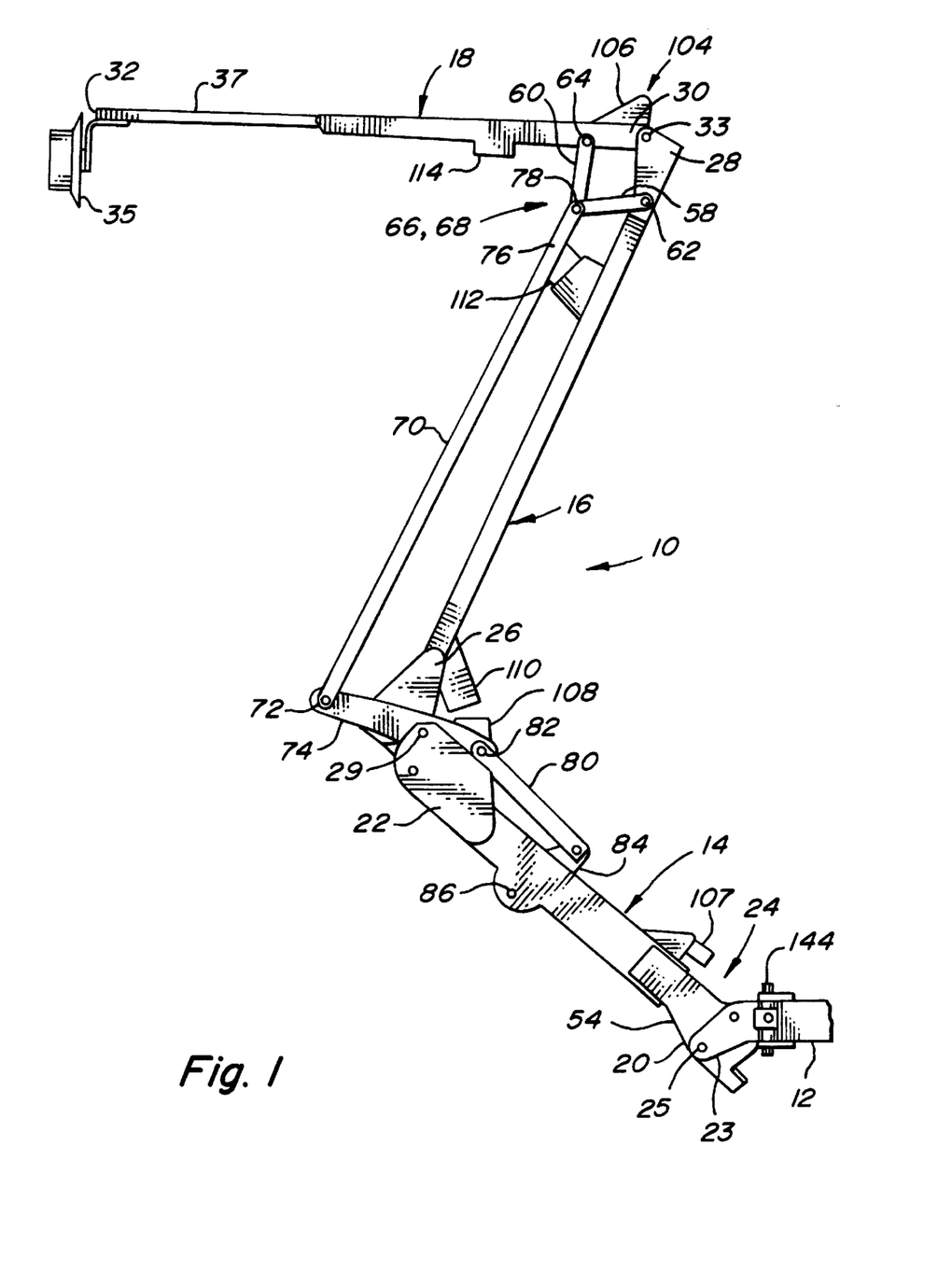
FIG. 1 is a front view of the tri-fold marker of the present invention in a partially folded position between the extended working position and the retracted transport position.

The folding boom of the present invention is shown as a tri-fold row marker 10 in FIG. 1 mounted to the end of toolbar 12 of an agricultural implement. The toolbar can be provided with a number of planting units (not shown) and may carry a variety of agricultural tools, such as a grain drill or a sprayer unit.

The row marker 10 comprises three segments, an inboard segment 14, a middle segment 16 and an outboard segment 18. The inboard segment 14 has a first end 20 and a second end 22. The first end 20 is pivotally coupled to the toolbar 12 by a plate 23 of a mounting bracket 24 and pivots about a pin 25. The middle segment 16 has a first end 26 and a second end 28. The first end 26 of the middle segment 16 is pivotally coupled to the second end 22 of inboard segment 14 at pin 29. Similarly the outboard segment 18 has a first end 30 and a second end 32. The first end 30 of the outboard segment 18 is pivotally coupled to the second end 28 of the middle segment 16 at pin 33. The second end 32 is provided with a surface-marking device comprising a marker disc 35 that is rotatably mounted to the outboard segment. The outboard segment 18 includes an extension tube 37 to which the marker disc 35 is secured. The extension tube 37 allows the operator to make minor length adjustments for different sized machines and to satisfy personal preferences as to marker location.

Figure 2:
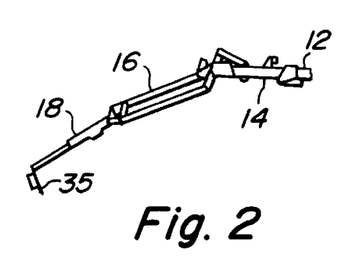
FIGS. 2–9 are front views of the tri-fold marker of the present invention in various positions between the extended working position in FIG. 2 and the folded transport position in FIG. 9.
Figure 3:
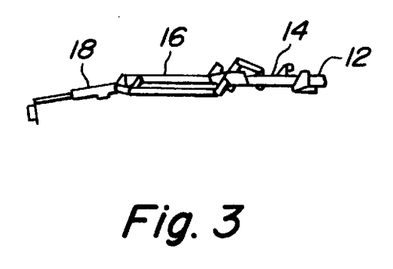
Figure 4:
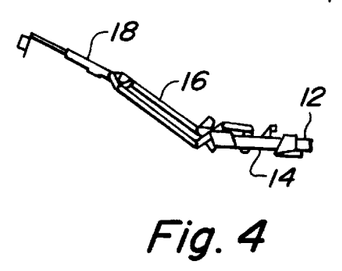
Figure 5:
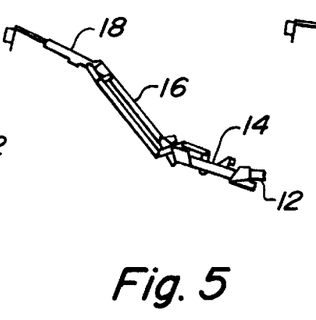
Figure 6:
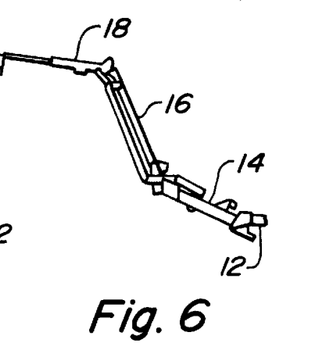
Figure 7:
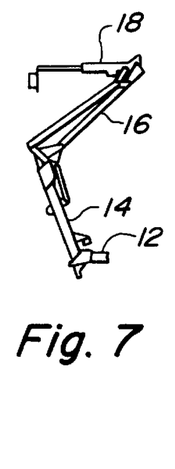
Figure 8:
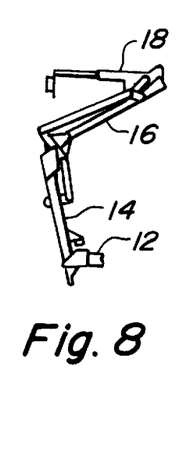
Figure 9:
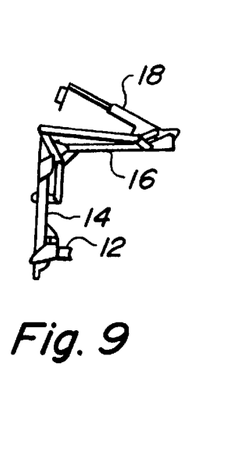

With reference to FIGS. 2–9 the folding motion of the boom is shown. FIG. 2 shows the marker in the lowermost float position. FIG. 3 shows a normal working position while the uppermost float position is shown in FIG. 4. Floating occurs by rotation of the middle segment 16 about the pin 29. The inboard segment 14 remains in a fixed position when the boom floats. Retraction of the hydraulic cylinder, described below, will raise the middle segment 16 from any position in the float range between FIGS. 2 and 4. Continued retraction of the hydraulic cylinder beyond the position of FIG. 4 results in the commencement of rotation of segment 14 about the pivot pin 25 and rotation of the outboard segment 18 in the opposite direction about the pivot pin 33. Rotation of the middle segment 16 about the pivot pin 29 is also accelerated. As the rotation of the inboard segment 14 approaches 60∩ relative to the toolbar 12, the rotation rates of the middle and outboard segments begin to decrease. When the middle segment reaches an angle of 90∩ to the inboard segment 14, the middle and outboard segments cease to rotate about pivot pins 29, 33 respectively. The entire assembly continues to rotate about the pivot pin 25 at the same rate until the inboard segment 14 reaches approximately 72∩ relative to the toolbar. At this point, the hydraulic cylinder begins to slow the rotation rate. When the inboard segment 14 reaches an angle of 90∩ to the toolbar, it too rests on a stop and all further rotation ceases.

The sequence described above is reversed for extension of the boom. When moving in the opposite direction, the damping effect of the cylinder ceases at the same approximately 72∩ point and permits rapid movement of the mechanism from that point. This rapid movement is permitted until a mechanical stop on the inboard segment has engaged the toolbar and the middle and outboard segments have reached an angle of approximately 22∩ above the toolbar. At that point, the hydraulic cylinder again retards the motion of the apparatus and provides a relatively slow approach of the marking device to the soil surface. Various types of cushioned hydraulic cylinders may be used including the cylinder described in Applicant's co-pending application filed and assigned application number , and which is commonly assigned, Attorney reference number 14924, and which is hereby incorporated by reference.

The above described motion is controlled by a first control linkage assembly 19 and a second control linkage assembly 21. The first control linkage assembly 19 controls the rotation of the middle segment relative to the inboard segment about the pivot 29 and is shown and described as follows with reference to FIGS. 10–15. The first end 26 of the middle segment 16 is provided with an end plate 38 mounted to the pin 29, FIG. 15. The end plate 38 forms a first bell crank 39. An inner control arm 40 is provided with a first end 42 and a second end 44. The first end 42 is pivotally coupled to a toggle link 46. The toggle link 46 is pivoted to the mounting bracket 24 at 48 and includes a cam follower 50, FIGS. 10–14. The cam follower 50 is disposed in a cam slot 52 formed in a plate 54 at the first end 20 of the inboard segment 14. The second end 44 of the inner control arm 40 is pivotally coupled to the first bell crank 39 at 56, FIG. 15. The inner control arm 40 pivots the middle segment 16 relative to the inboard segment 14 when the hydraulic cylinder (described below) is extended or retracted.

Figure 10:
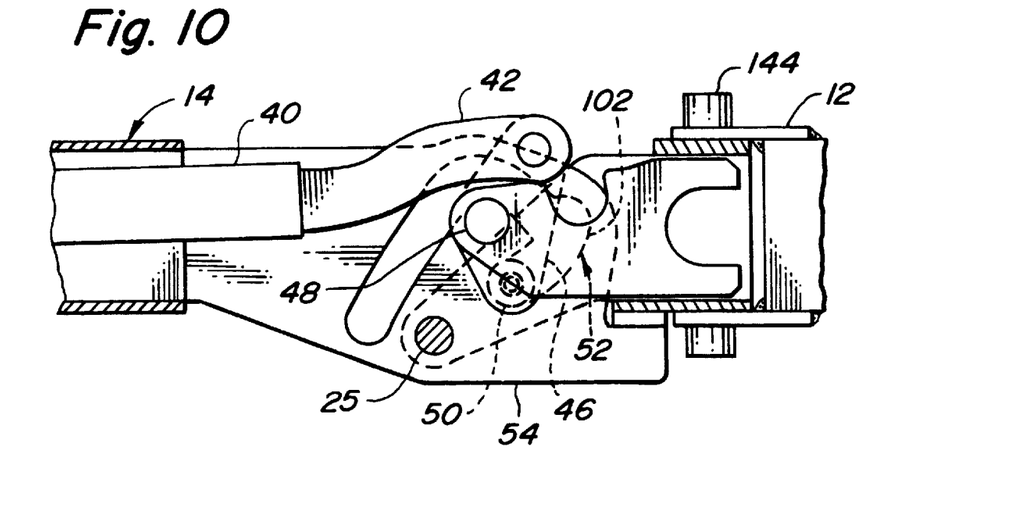
FIGS. 10–14 are enlarged front views of the pivot connection of the inboard segment to the toolbar illustrating the inboard segment in various positions.
Figure 11:
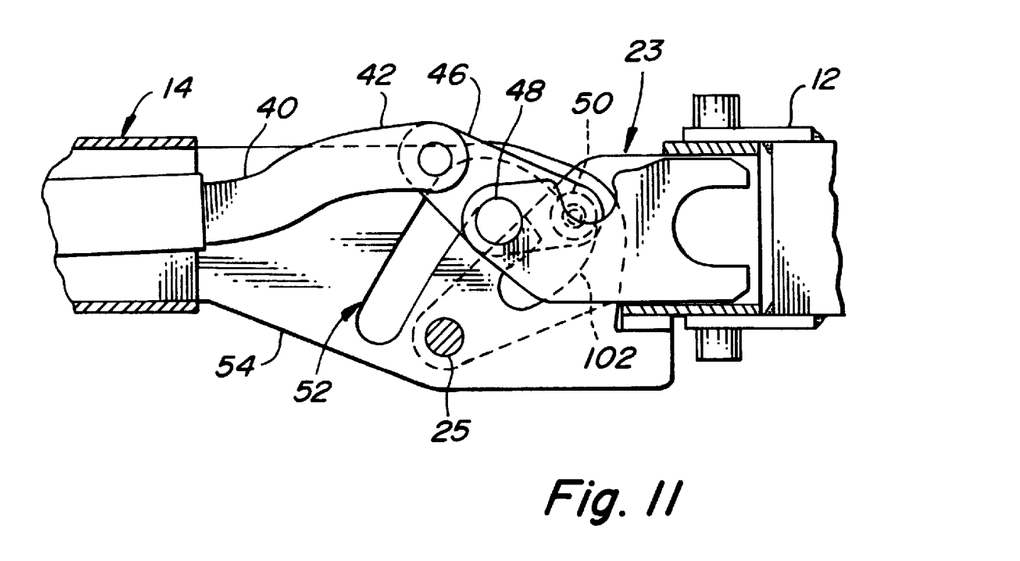

In its extended working position, the row marker is allowed to float up and down to a limited degree so that the marker disc 35 may follow the ground undulations as described above in connection with FIGS. 2–4. To enable this floating, the cam slot 52 has a float portion 102 through which the cam follower 50 moves as the boom floats. FIG. 10 shows the cam follower 50 at one end of the float portion 102 of the cam slot corresponding to the lower end of the float range. FIG. 11 shows the cam follower 50 at the other end of the float portion 102 of the cam slot corresponding to the upper end of the float range. Thus, during floating of the boom, the position of the middle segment controls the position of the toggle link 46. During folding and unfolding of the boom above the float range, the toggle link controls the position of the middle segment relative to the inboard segment as described below.

Figure 15:
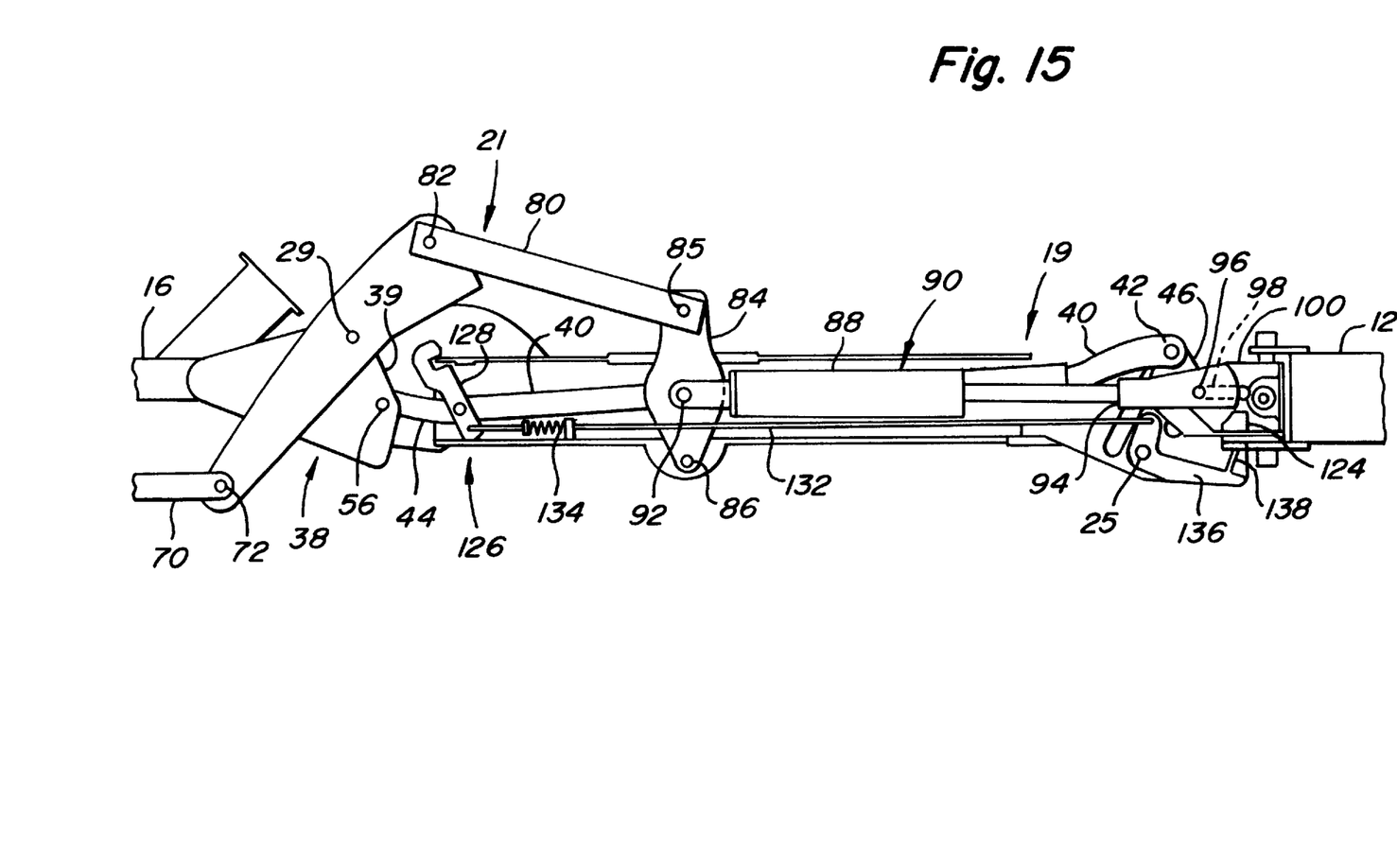
FIGS. 15 and 16 are enlarged front views of the inboard segment I two positions illustrating the hydraulic cylinder.
Figure 16:
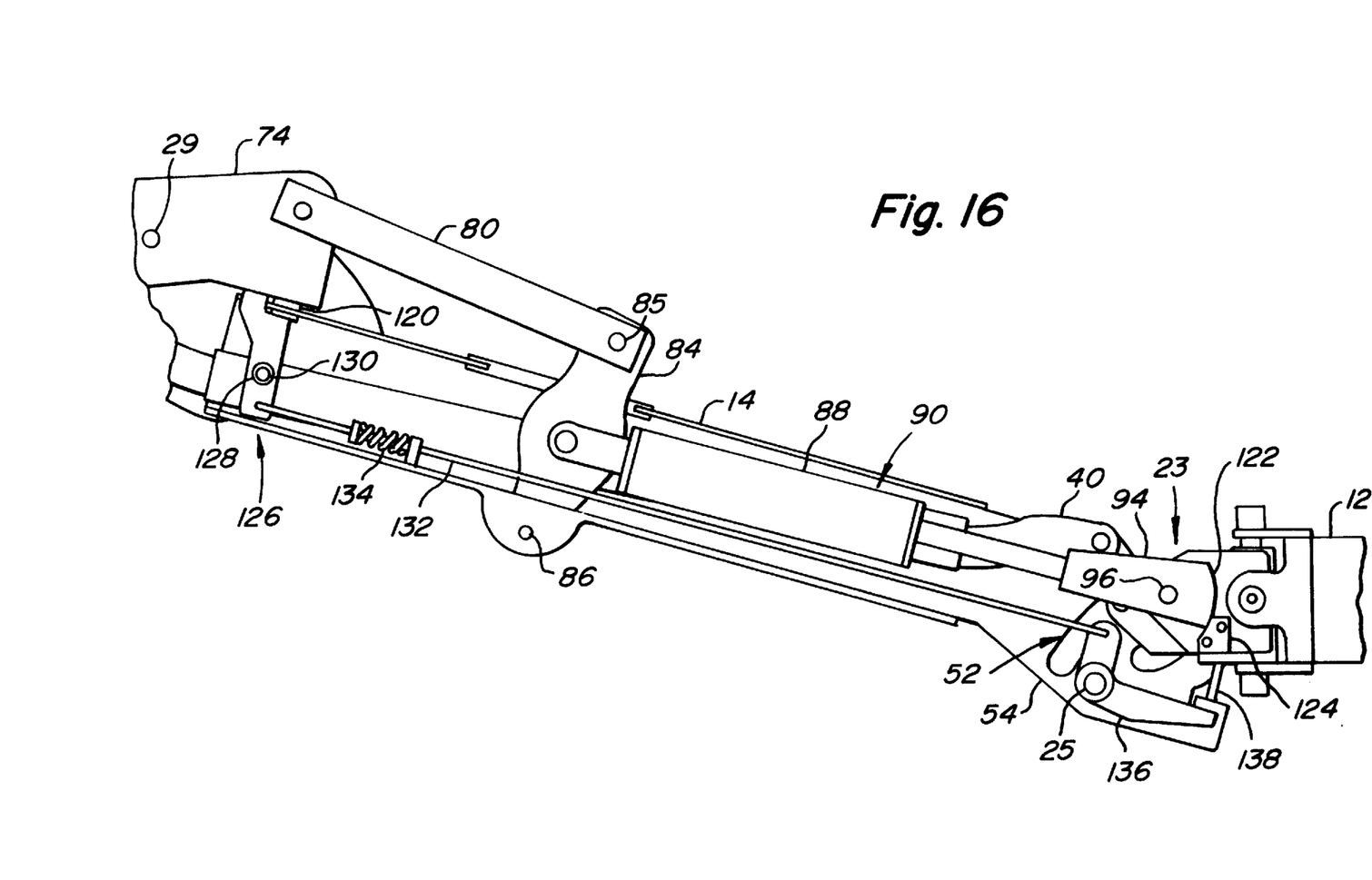

The second control linkage assembly 21 controls the rotation of the outboard segment 18 relative to the middle segment 16 about the pivot 29 as is now described and shown in connection with FIGS. 1, 15 and 16. Two pivot links 58 and 60 have first ends 62 and 64 that are pivotally coupled to the middle and outboard segments 16 and 18, respectively. The pivot links 58 and 60 have second ends 66 and 68. An outer control arm 70 has a first end 72 that is pivotally coupled to a second bell crank 74. The outer control arm has a second end 76 that is pivotally coupled to the second ends 66 and 68 of pivot links 58 and 60 at 78. The outer control arm 70 pivots the outboard segment 18 relative to the middle segment 16 when the hydraulic cylinder is extended or retracted.

The second bell crank 74 pivots about the pin 29 that pivotally joins the inboard and middle segments 14, 16 to one another. The second bell crank 74 is also coupled to one end of a control link 80 at 82. The control link 80 is in turn coupled at its other end to a control link 84 at 85. The control link 84 is pivotally mounted to the inboard segment 14 at 86. The cylinder portion 88 of a double acting hydraulic cylinder 90 is pivotally coupled to the control link 84 at 92, intermediate the two connections 85, 86 to the control link 84. The piston rod of the hydraulic cylinder 90 includes a clevis 94 having a pin 96. The pin 96 moves in a float slot 98 in the plate 100 of the mounting bracket 24. As the two outer segments float, the pin 96 moves along the float slot 98. The outboard segment 18 is thus able to control the position of the cylinder during floating of the boom through the second control linkage assembly 21. This same linkage assembly is used to control the position of the outboard segment 18 whenever the cylinder is less than fully extended.

The middle and outboard segments 16, 18 are locked in a rigid extended configuration by the outer stop 104. The outer stop comprises two plates that are welded to the middle and outboard segments. Only outboard segment stop plate 106 is shown in FIG. 1 as the flange forming the pivot 33 hides the other stop plates. In its extended working position, the marker disc of the row marker contacts the ground forcing the outboard segment 18 upwardly. This upward force rotates the outboard segment 18 about pivot pin 33 forcing the outboard segment stop plate 106 against the middle segment stop plate.

Stops are provided between the segments and engage when the boom is in the retracted position. The inboard segment carries a stop 107 that engages the toolbar 12. Stops 108 and 110 on the inboard and middle segments respectively engage one another, as do stops 112 and 114 on the middle and outboard segments respectively.

Retracting the cylinder 90 rotates the second bell crank 74 about the pivot 29, thereby causing the middle segment 16 and outboard segment 18 to be raised. The second bell crank 74 continues to rotate and raise the two outer segments until its stop block 120 contacts the inboard segment 14 as shown in FIG. 16. Further rotation of the second bell crank 74 is prevented. Further retraction of the hydraulic cylinder 90 causes the inboard segment 14 to begin rotation about the pivot 25.

The pin 96 is normally permitted to slide back and forth in the slot 98 to permit the boom to float, however, once the boom begins to fold by rotation of the inboard segment 14, it is necessary to prevent the pin 96 from moving in the slot 98. If the end of the cylinder were not fully restrained during folding and unfolding operations, it would be possible for the middle and outboard segments to flail about as the machine is drawn across rough terrain. The end of the cylinder is restrained during the folding and unfolding of the boom by operation of a cam and stop block mechanism incorporated into the cylinder clevis 94 and the plate 100 of the mounting bracket 24 containing the float slot 98. Rotation of the inboard segment 14 about the pin 25 causes the cylinder to rotate about the pin 96. This rotation causes the cam shaped ear 122 of the clevis 94 to engage a stop block 124 as shown in FIG. 16. Engagement of the clevis 94 with the stop block 124 permits freedom of rotation about the cylinder pin 96 but prevents lateral movement of the pin 96 within the float slot 98. This prevents unintended movement of the outboard segment 18.

A spring loaded latch mechanism 126 is provided within the inboard segment 14. The latch mechanism 126 includes a latch member 128 that pivots relative to the inboard segment 14 about the pin 130. The latch member 128 includes a hook portion that engages both the frame of the inboard segment 14 and the second bell crank 74 adjacent the stop block 120. A spring loaded latch control rod 132 controls the latch member 128 and is biased by a spring 134. A latch release lever 136 is coupled to the control rod 132 and pivots about the pin 25. The position of the latch release lever 136 is controlled by a pin 138 extending from the latch release lever 136 and engagable with the underside of the toolbar 12. When the inboard segment 14 is in the extended position shown in FIG. 15, the pin 138 engages the toolbar 12, causing the latch release lever 136 to rotate clockwise about the pivot 25, pulling on the rod 132 and rotating the latch member 128 counterclockwise about the pivot 130 to a released position.

As the inboard segment 14 begins to rotate clockwise about the pivot 25 as the boom is folded, the pin 138 will move away from the toolbar 12 allowing the release lever 136 to rotate counterclockwise as the spring 134 biases the control rod 132 to the left as viewed in FIG. 16. This rotates the latch member 128 into a latched position shown in FIG. 16. In the latched position, the hook portion of the latch member 128 engages both the second bell crank 74 and the inboard segment 14. This restrains the second bell crank 74 and prevents unintended movement of the outboard segment 18. As a result of this restraint, the second bell crank remains in a fixed position relative to the inboard segment. When the inboard segment pivots about 25, the first control linkage assembly 19 forces the middle segment 16 to continue rotating about the pivot 29. It then becomes necessary for the outboard segment 18 to commence rotation in the opposite direction around pin 33.

Figure 12:
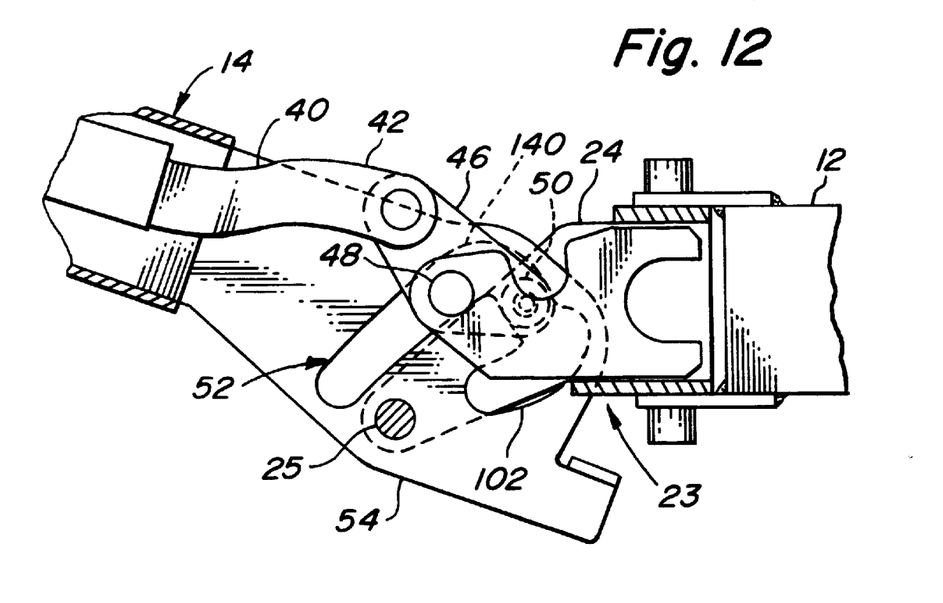

With reference to FIG. 12, it can be seen that the inboard segment 14 has been rotated clockwise a few degrees about the pivot 25. This causes the cam follower 50 to be constrained within a dogleg control portion 140 of the cam slot 52. This controls movement of the toggle link 46 thus controlling the relative position of the middle segment 16 with respect to the inboard segment 14. This rotation of the inboard segment 14 also causes the latch mechanism 126 to engage, thereby fixing the position of the second bell crank 74 relative to the inboard segment 14.

Figure 13:
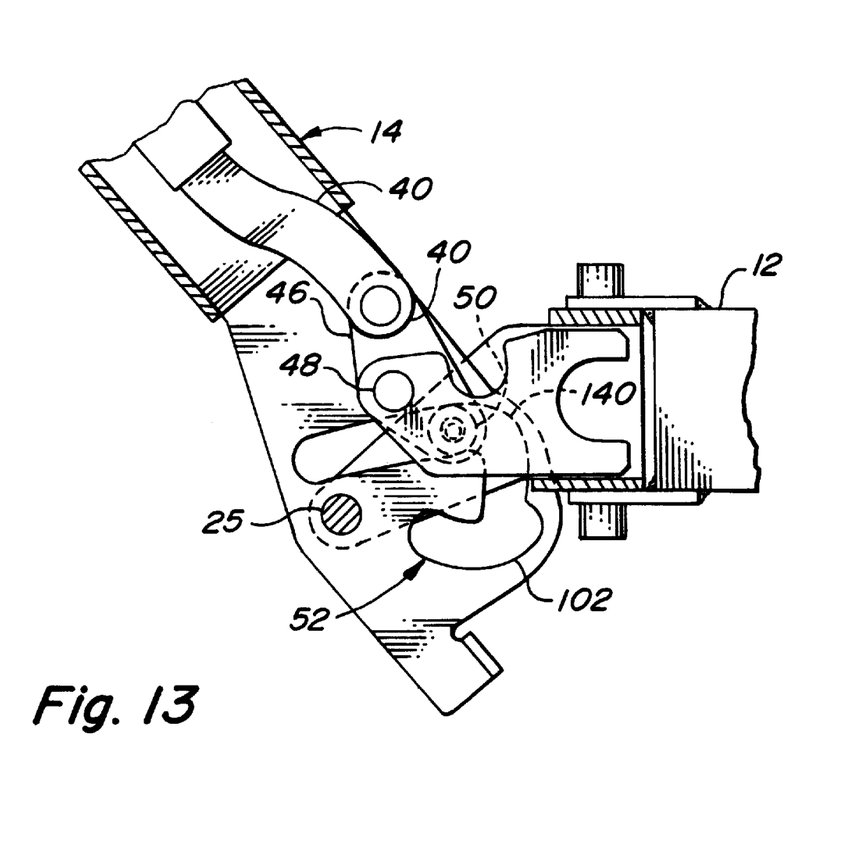

FIG. 13 illustrates further rotation of the inboard segment 14 about the pivot 25 and further movement of the cam follower 50 within the cam slot. Rotation of the toggle link 46 is required due to the constraints imposed by the cam slot. Rotation of the toggle link 46 causes displacement of the inner control arm 40 and the resultant rotation of the middle segment 16 about the pivot 29. As the cam follower 50 passes the bend in the dogleg shaped control portion 140 of the cam slot, the toggle link rotation comes into synchrony with that of the inboard segment 14 and thereafter, there is little relative linear displacement of the inner control arm 40 and little resultant rotation of the middle segment 16 about the pivot 29.

Figure 14:
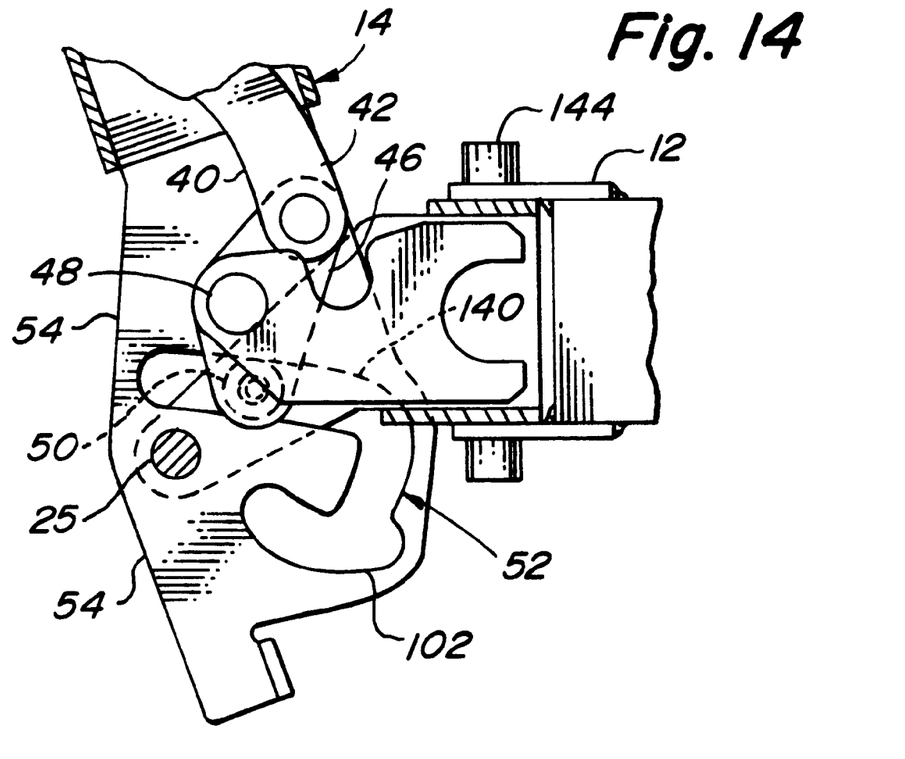

With reference to FIG. 14, the inboard segment 14 is further rotated and the cam follower 50 continues further movement in the cam slot. Rotation of the toggle link 46 is now synchronized with that of the inboard segment 14 and rotation of the middle segment 16 about the pivot 29 ceases. From this point forward, the middle and outboard segments 16, 18 remain fixed in relationship to one another. The inboard segment 14 will continue to rotate until it is approximately perpendicular to the toolbar 12. Unfolding of the mechanism will follow the previously described sequence in a reverse order.

The mounting bracket 24 is coupled to toolbar 12 for rotation about a pin 144. A shear pin or shear bolt holds the bracket in a fixed position about the pivot 144 and is designed to break away at a predetermined load if the boom strikes a hard object, to prevent damage to the boom.

The tri-fold row marker of the present invention should not be limited by the above-described embodiments, but should be limited solely by the claims that follow.

We claim:

1. A folding boom for a machine, the boom having an extended working position and a retracted storage position, the boom comprising:

an inboard segment having a first end and a second end, the first end of the inboard segment being pivotally mounted to the machine;

a middle segment having a first end and a second end, the first end of the middle segment being pivotally mounted to the second end of the inboard segment;

an outboard segment having a first end and a second end, the first end of the outboard segment being pivotally mounted to the second end of the middle segment;

a first bell crank mounted to the middle segment and extending downwardly therefrom;

a toggle mechanism including a toggle link pivotally mounted to the machine, a cam follower on the toggle link and a cam slot in the inboard segment adjacent the first end thereof with the cam follower disposed therein;

an inner control arm having a first end and a second end, the first end of the inner control arm being pivotally coupled to the toggle mechanism and the second end of the inner control arm being pivotally coupled to the first bell crank;

a first pivot link having a first end and a second end, the first end being pivotally mounted to the middle segment;

a second pivot link having a first end and a second end, the first end being pivotally mounted to the outer arm;

a second bell crank pivotally mounted to the second end of the inboard segment;

a first control link mounted to the inboard segment;

a second control link connected to the first control link and the second bell crank;

an outer control arm having a first end and a second end, the first end of the outer control arm being pivotally coupled to the second bell crank, the second end of the outer control arm being pivotally coupled to the second ends of both the first and second pivot links; and a hydraulic cylinder having a first end and a second end, the first end of the hydraulic cylinder being pivotally coupled to the implement, the second end of the hydraulic cylinder being pivotally coupled to the first control link, the hydraulic cylinder having an extended position and a retracted position;

wherein retracting the hydraulic cylinder from its extended working position to its retracted storage position first pivots the middle segment relative to the inboard segment until a stop is reached after which the inboard segment pivots relative to the machine while the middle segment continues to pivot relative to the inboard segment and the outboard segment begins to pivot relative to the middle segment in the opposite direction until the middle and outboard segments reach stop positions and cease to rotate relative to the inboard segment while the inboard segment continues to rotate until the hydraulic cylinder is in its retracted storage position.

2. The folding row marker as defined in claim 1 wherein the inboard segment is an elongated hollow member and the hydraulic cylinder is substantially contained therein.

3. The folding row marker as defined in claim 1 wherein the middle and outboard segments are able to float up and down to follow ground undulations and the cam slot includes a float portion and a control portion with the cam follower moving through the float portion as the middle and outboard segments float.

4. The folding row marker as defined in claim 3 wherein the position of the cam follower in the control portion of the cam slot controls the position of the middle segment relative to the inboard segment.

5. The folding row marker as defined in claim 1 further comprising a latch mechanism operable to hold the second bell crank in a stop position after rotation of the inboard segment from the extended working position toward the retracted storage position.

6. The folding row marker as defined in claim 1 wherein one end of the hydraulic cylinder is coupled by a pin and slot mechanism in which the pin moves through a float slot as the middle and outboard segments float and further comprising a cam stop engagable with the hydraulic cylinder after rotation of the inboard segment from the extended working position toward the retracted storage position to prevent movement of the pin in the float slot when the inboard segment is in a position other than the extended working position.

7. The folding row marker as defined in claim 1 wherein the hydraulic cylinder is a cushion hydraulic cylinder having reduced rates of extension and retraction at the ends of travel of a cylinder piston rod.

8. A folding boom for an implement, the boom having an extended working position and a retracted storage position, the boom comprising:

an inboard segment having first and second ends, the first end of the inboard segment being pivotally mounted to the implement by a first pivot;

a middle segment having first and second ends, the first end of the middle segment being pivotally mounted to the second end of the inboard segment by a second pivot;

an outboard segment having first and second ends, the first end of the outboard segment being pivotally mounted to the second end of the middle segment by a third pivot;

a first control linkage assembly controlling the rotation of the middle segment relative to the inboard segment about the second pivot;

a second control linkage assembly controlling the rotation of the outboard segment relative to the middle segment about the third pivot; and a double acting hydraulic cylinder to extend and retract the folding boom;

wherein the middle and outboard segments are able to float up and down over a float range by rotation about the second pivot, and upon folding of the boom from the extended working position the middle segment first rotates about the second pivot until an upper limit of the float range is reached after which the inboard segment begins to rotate about the first pivot while the middle segment continues to pivot about the second pivot and the outboard segment begins to rotate about the third pivot until the middle segment reaches a stop position relative to the inboard segment after which the middle segment stops rotating about the second pivot while the inboard segment continues to rotate about the first pivot until the retracted storage position is reached.

9. The folding boom as defined by claim 8 wherein as the boom is folded, the outboard segment reaches a stop approximately simultaneously with the middle segment reaching a stop.

10. The folding boom as defined by claim 8 wherein the hydraulic cylinder is a cushion cylinder with reduced rates of extension and retraction of a cylinder rod at each end of travel of the cylinder rod.

11. The folding boom as defined by claim 8 wherein the first control linkage assembly comprises:

a toggle link pivoted to the machine;

a cam slot in the inboard segment;

a cam follower carried by the toggle link and disposed in the cam slot for movement therein;

a first control arm having first and second ends, the first end of the first control arm being pivoted to the toggle link for movement of the control arm as the cam follower moves along the cam slot; and a bell crank fixed to the middle segment and to the second end of the first control arm whereby the position of the cam follower in the cam slot controls the position of the middle segment relative to the inboard segment.

12. The folding boom as defined by claim 11 wherein the second control linkage assembly comprises:

a second bell crank pivoted at the second pivot;

a second control arm having first and second ends, the first end of the second control arm being pivoted to the second bell crank;

first and second pivot links having first ends pivoted to the middle and outboard segments respectively and second ends pivoted to the second end of the second control arm;

a first control link mounted to the inboard segment and coupled to one end of the cylinder; and a second control link pivotally coupled to the first control link and to the second bell crank whereby the position of the cylinder controls the rotational position of the outboard segment relative to the middle segment.

13. The folding boom as defined by claim 12 further comprising a latch to hold the second bell crank in a fixed position relative to the inboard segment after rotation of the inboard segment from the extended working position toward the retracted storage position.

* * * * *